(12) United States Patent
Albesa et al.

(10) Patent No.: US 12,045,377 B2
(45) Date of Patent: Jul. 23, 2024

(54) METHOD AND DEVICE FOR SECURED DECIPHERING OF CIPHERING DATA

(71) Applicants: STMicroelectronics (Alps) SAS, Grenoble (FR); STMicroelectronics (Grand Ouest) SAS, Le Mans (FR)

(72) Inventors: Franck Albesa, Parigne l'eveque (FR); Nicolas Anquet, Grenoble (FR)

(73) Assignees: STMicroelectronics (Alps) SAS, Grenoble (FR); STMicroelectronics (Grand Ouest) SAS, Le Mans (FR)

( * ) Notice: Subject to any disclaimer, the term of this patent is extended or adjusted under 35 U.S.C. 154(b) by 218 days.

(21) Appl. No.: 17/657,020

(22) Filed: Mar. 29, 2022

(65) Prior Publication Data

US 2022/0318434 A1    Oct. 6, 2022

(30) Foreign Application Priority Data

Mar. 31, 2021    (FR) ...................................... 2103318

(51) Int. Cl.
*G06F 21/32*        (2013.01)
*G06F 9/4401*        (2018.01)
*G06F 21/72*        (2013.01)
*H04L 9/08*        (2006.01)

(52) U.S. Cl.
CPC ............ *G06F 21/72* (2013.01); *G06F 9/4401* (2013.01); *H04L 9/0861* (2013.01)

(58) Field of Classification Search
CPC ........ G06F 21/72; G06F 9/4401; G06F 21/32; H04L 9/0861; H04L 9/0822; H04L 9/0869; H04L 9/088; H04L 9/0894; H04L 9/14; H04L 9/0836
See application file for complete search history.

(56) References Cited

U.S. PATENT DOCUMENTS

| | | | |
|---|---|---|---|
| 9,064,135 B1 | 6/2015 | Poo et al. | |
| 2011/0038479 A1 | 2/2011 | Bilodi | |
| 2014/0310535 A1 | 10/2014 | Sibert | |
| 2016/0283937 A1 | 9/2016 | Reese | |
| 2016/0364343 A1 | 12/2016 | Case | |
| 2019/0089529 A1* | 3/2019 | Conway | H04L 9/0819 |
| 2019/0334882 A1 | 10/2019 | Mondello | |
| 2019/0372780 A1* | 12/2019 | Messerges | H04L 9/3263 |
| 2021/0044972 A1 | 2/2021 | Murray | |
| 2021/0357526 A1* | 11/2021 | Yekhanin | H04L 9/0894 |
| 2022/0131848 A1* | 4/2022 | Shiner | H04L 63/126 |

OTHER PUBLICATIONS

Ball, Matthew V., et al., "The XTS-AES Tweakable Block Cipher An Extract from IEEE Std 1619-2007," published Apr. 18, 2008, 24 pages.

(Continued)

*Primary Examiner* — Quazi Farooqui
(74) *Attorney, Agent, or Firm* — Slater Matsil, LLP (57) ABSTRACT

The present disclosure relates to a method for decrypting encrypted data. The method includes generating a first count value by a monotonic counter of a processing device, deriving, using a key derivation circuit, a first encryption key based on the first count value, transmitting the first encryption key to a cryptographic processor; and decrypting, based on the first encryption key, first encrypted data.

20 Claims, 6 Drawing Sheets

(56) References Cited

OTHER PUBLICATIONS

Sarmenta, Luis F. G. et al., "Virtual Monotonic Counters and Count-Limited Objects using a TPM without a Trusted OS," ST ✖ 06, Proceedings of the first ACM Workshop on Scalable trusted computing Nov. 3, 2006, Alexandria, Virginia, 15 pages.

Welter, Oliver, "Data Protection and Risk Management on Personal Computer Systems Using the Trusted Platform Module," Jan. 1, 2018, Technical University of Munich Chair tor data processing, 109 pages.

* cited by examiner

METHOD AND DEVICE FOR SECURED DECIPHERING OF CIPHERING DATA

CROSS-REFERENCE TO RELATED APPLICATIONS

This application claims priority to French Application No. 2103318, filed on Mar. 31, 2021, which application is hereby incorporated herein by reference.

TECHNICAL FIELD

The present disclosure relates to the field of methods and devices for securing electronic circuits, and in particular a device and method for decrypting data.

BACKGROUND

Some processing devices comprise cryptographic processors requiring the use of encryption keys that must not be accessible from outside the device.

For example, a processing device is operated by executing codes, stored in a non-volatile memory of the device, used in the life of the circuit. For security purposes, some codes are stored in an encrypted manner, and encryption keys may be loaded to decrypt these codes.

SUMMARY

In various embodiments, the security of storing such encryption keys is improved.

One embodiment provides a method for decrypting encrypted data, the method comprises generating a first count value by a monotonic counter of a processing device, deriving, using a key derivation circuit, a first encryption key based on the first count value; and transmitting the first encryption key to a cryptographic processor; and decrypting, based on the first encryption key, a first encrypted data.

According to one embodiment, the first encrypted data comprises a first set of one or more other encrypted encryption keys associated with the first count value.

According to one embodiment, the method further comprises selecting the first set of other encrypted encryption keys from a memory; and providing the first set of other encrypted encryption keys to the cryptographic processor, wherein decrypting first data comprises decrypting, by the cryptographic processor based on the first encryption key, the first set of other encrypted encryption keys.

According to one embodiment, the method further comprises decrypting, by the cryptographic processor or another cryptographic processor, the first other encrypted data stored in the memory or in another memory based on the first set of other decrypted encryption keys.

According to one embodiment, decryption of the first other encrypted data is performed by the cryptographic processor, with the first set of other decrypted encryption keys being stored in a memory of the cryptographic processor.

According to one embodiment, the method further comprises generating a second count value by the monotonic counter of the processing device, deriving, using the key derivation circuit, a second encryption key based on the second count value; and transmitting the second encryption key to the cryptographic processor; and decrypting, based on the second encryption key, the second encrypted data.

According to one embodiment, the monotonic counter is initialized to the first count value upon a first boot of the processing device, the method further comprising, initializing the monotonic counter to the second count value upon a second boot of the processing device.

According to one embodiment, the method comprises another boot of the processing device during which the monotonic counter is initialized to the first count value if a device state condition is satisfied.

According to one embodiment, the state condition corresponds to the programming state of an area of the memory.

According to one embodiment, the memory is configured such that access to the first encrypted data is not allowed based on a count value greater than the first count value.

According to one embodiment, transmission of the first encryption key to a cryptographic processor is performed via a dedicated bus.

One embodiment provides a data processing device that comprises a monotonic counter configured to generate a first count value, a key derivation circuit configured to derive, using a key derivation function, a first encryption key based on the first count value; and a cryptographic processor configured to receive the first encryption key, and decrypt, based on the first encryption key, the first encrypted data.

One embodiment provides a method for decrypting encrypted data, the method comprises receiving a first count value from a monotonic counter of a processing device; deriving, using a key derivation circuit, a first master encryption key based on the first count value and a master encryption key; transmitting the first master encryption key to a cryptographic processor; and decrypting, based on the first master encryption key, a first encrypted key stored in a non-volatile memory.

According to one embodiment, the method further comprises decrypting, based on the first master encryption key, another first encrypted key, where the first encrypted key and the another first encrypted key comprises a first set of encrypted encryption keys associated with the first count value.

According to one embodiment, the non-volatile memory is configured such that access to the first encrypted key is not permitted based on a count value greater than the first count value.

According to one embodiment, the method further comprises transmitting the first encryption key to the cryptographic processor or another cryptographic processor; and decrypting, based on the first encryption key, a first encrypted code.

According to one embodiment, the method further comprises launching a boot sequence, initializing the monotonic counter that provides the first count value, and reading and executing the first code obtained from decrypting the first encrypted code.

According to one embodiment, the method further comprises receiving a second count value from the monotonic counter of the processing device, deriving, using the key derivation circuit, a second master encryption key based on the second count value, transmitting the second master encryption key to the cryptographic processor, decrypting, based on the second master encryption key, a second encrypted key, transmitting the second encryption key to the cryptographic processor or another cryptographic processor, and decrypting, based on the second encryption key, a second encrypted code.

According to one embodiment, the monotonic counter is initialized to the first count value upon a first boot of the processing device, the method further comprising, initializing the monotonic counter to the second count value upon a second boot of the processing device.

According to one embodiment, the method further comprises performing another boot of the processing device during which the monotonic counter is initialized to the first count value if a device state condition is satisfied, wherein the state condition corresponds to a programming state of an area of the memory.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the design of processing devices is well known to the person skilled in the art and certain components have not been described in the following.

Unless otherwise specified, when reference is made to two elements being connected to each other, this means directly connected without intermediate elements other than conductors, and when reference is made to two elements being coupled to each other, this means that these two elements may be connected or may be connected via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
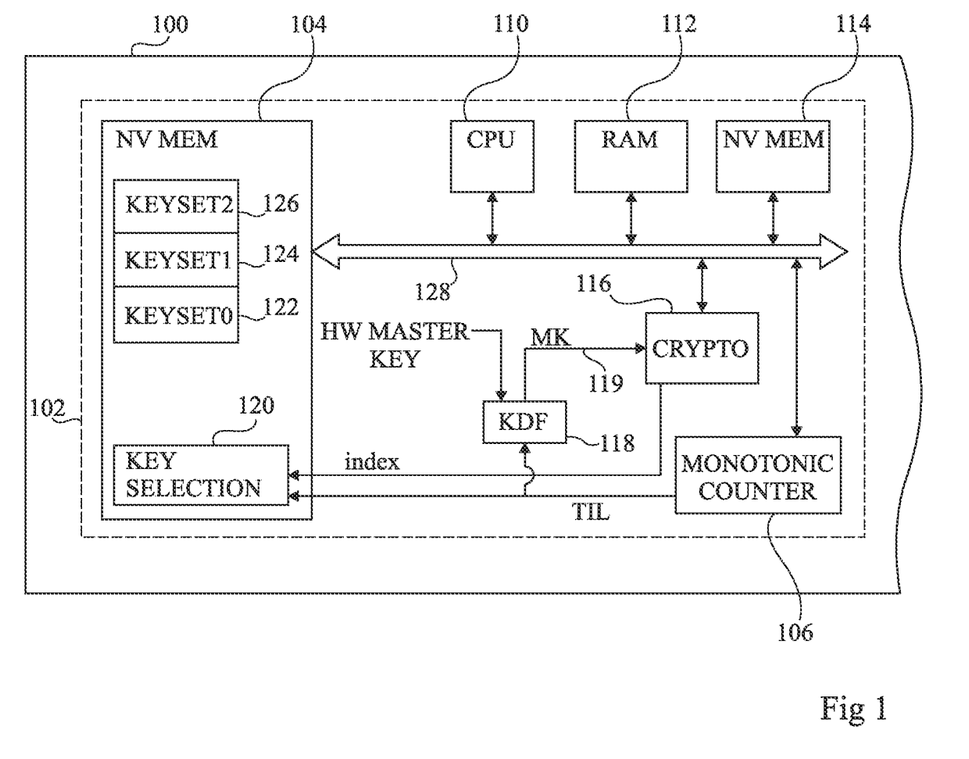
FIG. 1 represents, very schematically and in block form, an electronic device according to one embodiment of the present description.

FIG. 1 represents, very schematically and in block form, an electronic device 100 comprising a processing device 102.

The electronic device 100 is, for example, an electronic board such as a microcircuit board, computer hardware, microprocessor circuit, etc.

The processing device 102 comprises, for example, a non-volatile memory 104 (NV MEM), such as a flash memory. Alternatively, other types of non-volatile memory could be used. The processing device 102 also comprises a monotonic counter 106 (MONOTONIC COUNTER).

Monotonic counters are known in the background art, with an example of such a counter being described in the publication "Virtual Monotonic Counters and Count-Limited Objects using a TPM without a Trusted OS" by L. F. G. Sarmenta, M. Van Dijk, C. W. O'Donnell, J. Rhodes, and S. Devadas, and in particular in part 3 of this paper. This paper describes embodiments of a counter implemented in hardware and/or software form. The monotonic counter 106 is, for example, implemented in hardware form by a digital circuit, such as an Application Specific Integrated Circuit (ASIC). The monotonic counter is configured to maintain a count value, accessible at an output of the counter. Following an increment command, the monotonic counter increases its count value by one or more units but, following each increment, the operation is not reversible. Indeed, the monotonic counter is configured so that its count value never decreases. Moreover, between two increments, the count value is protected against all modifications, so that it can neither be erased nor modified. Only the increment command allows the replacement of the current value by a new value higher than the current value.

For example, the monotonic counter 106 is configured so that no command, other than a reset of the processing device, allows the previous value to be returned to once the increment command is executed. For example, in the case where the count value is stored in a volatile manner, each time the processing device is turned off (power cut), the count value is lost and each time the device is turned back on, the monotonic counter generates an initial count value again. In the case where the count value is stored in a non-volatile storage element. On each reboot, an initial count value is, for example, written back to the non-volatile storage element of the monotonic counter.

The processing device 102 further comprises a non-secure generic processor 110 (CPU). For example, the generic processor 110 is coupled via a bus 128 to the monotonic counter 106 as well as to a non-volatile memory 114 (NV MEM) and the non-volatile memory 104. The memory 114 is, for example, flash, but other types of non-volatile memory could be used.

The generic processor 110 is further coupled via bus 128 to a cryptographic processor (CRYPTO) 116 as well as to a RAM (random access memory) 112.

The cryptographic processor 116 is further coupled to a key derivation circuit 118 (KDF), having an input connected to the output of the monotonic counter 106. In particular, the key derivation circuit 118 receives a current count value (TIL) from the monotonic counter 106 at this input. The count values TIL generated by the monotonic counter 106 are, for example, temporal isolation level values, which allow for temporal control of a decryption operation. In particular, the key derivation circuit 118 is configured, for example, to generate master encryption keys MK derived by a key derivation function based on the count value TIL generated by the monotonic counter 106, and optionally based on a device master encryption key (HW MASTER KEY).

The master encryption keys MK are provided, for example via a dedicated bus 119, to the cryptographic processor 116. The cryptographic processor 116 is, for example, configured to decrypt encrypted data based on the master encryption keys MK derived by the circuit 118. The monotonic counter 106 is, for example, controlled to increment its count value TIL during operation of the device 102, for example during the boot phase. Since this count value TIL is taken into account by the key derivation function implemented by the circuit 118, the decryption of the data by the cryptographic processor 116 based on the corresponding master encryption key MK depends on this count value. Thus, it is possible to limit time periods during which it is possible to decrypt data.

In an example of one embodiment, the data decrypted, based on the master encryption keys MK are encrypted encryption keys. For example, the non-volatile memory 114 contains encrypted data, such as encrypted boot codes of the processing device 102. The encryption keys allowing this encrypted data to be decrypted are also encrypted and are stored in memory 104. In the example shown in FIG. 1, the encrypted encryption keys are stored in areas 122, 124, and 126 (KEYSET0, KEYSET1, and KEYSET2) of memory 104. For example, a set of keys stored in area 122 is associated with a first TIL count value, a set of keys stored in area 124 is associated with a second count value TIL greater than the first, and a set of keys stored in area 126 is associated with a third count value TIL greater than the second.

In some cases, the memory 104 comprises a selection circuit 120 (KEY SELECTION), which receives the count value TIL and an index value, for example transmitted by the cryptographic processor 112, allowing the selection of a given key from each key set.

Figure 2:
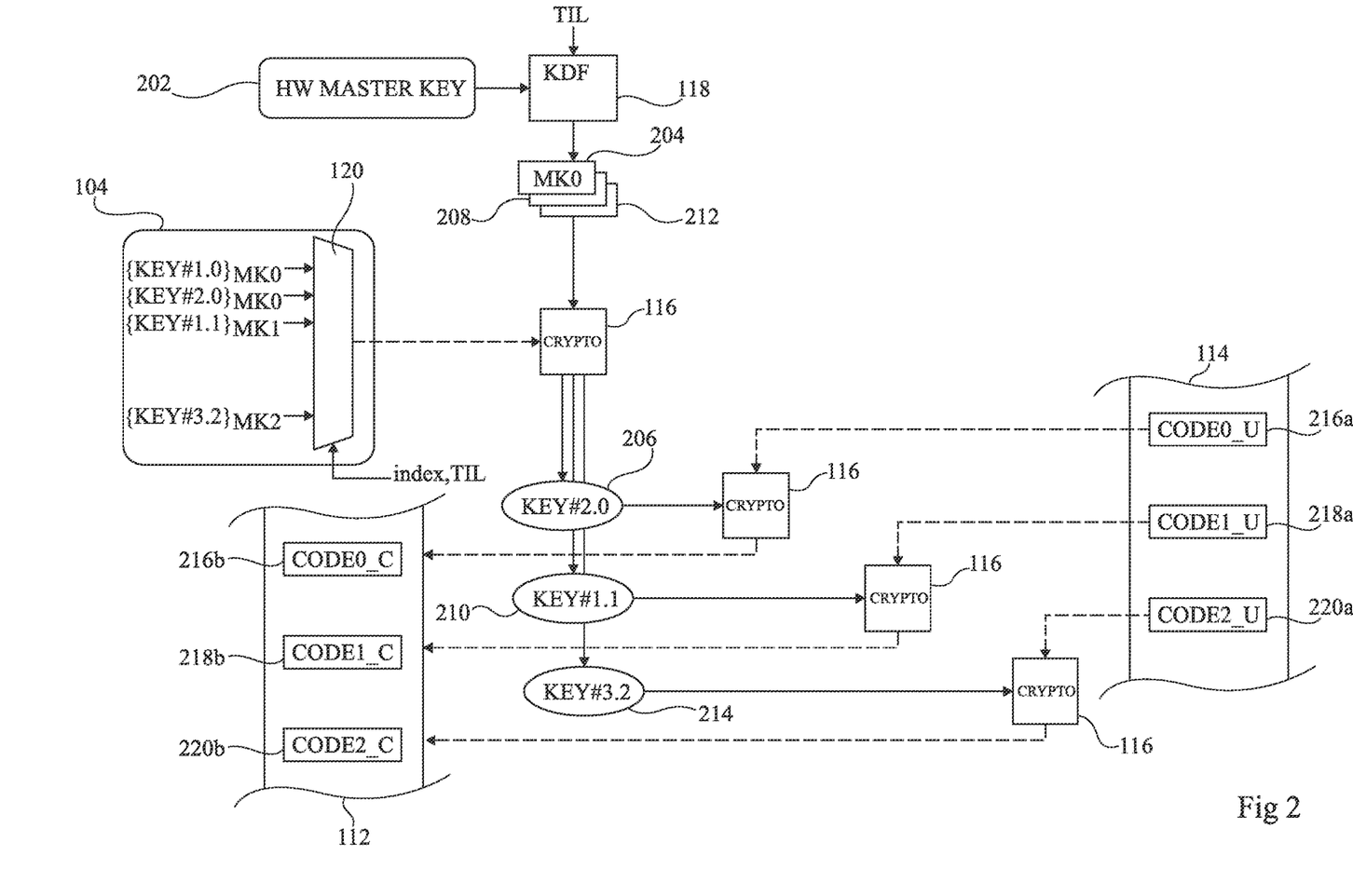
FIG. 2 illustrates an example of operation of a processing device of FIG. 1.

FIG. 2 illustrates an example of the operation of the processing device 102 of FIG. 1 for decrypting encrypted keys stored in the non-volatile memory 114. In particular, FIG. 2 illustrates the key derivation circuit (KDF) 118, the memories 104, 112, and 114, and the cryptographic processor (CRYPTO) 116. In FIG. 2, the dotted arrows represent data transfers by the bus 128, and solid arrows represent transfers by dedicated bus or connection.

In the example illustrated in FIG. 2, the non-volatile memory 114 comprises three encrypted codes 216a, 218a and 220a (CODE0_U, CODE1_U and CODE2_U). For example these codes are boot codes. The cryptographic processor 116 is able to decrypt each of these encrypted codes using the encrypted encryption keys stored in the memory 104 to generate three corresponding decrypted codes 216b, 218b, 220b (CODE0_C, CODE1_C and CODE2_C). The device master key (HW MASTER KEY) is for example securely stored in a non-volatile memory 202, which may for example be part of the memory 104. The master encryption key is for example a value that is unique to each device and is, for example, generated based on a PUF-Physically Unclonable Function. The advantage of using a device-specific master encryption key is that it makes it difficult to clone the device.

In FIG. 2, the selection circuit 120 is represented by a multiplexer, which receives the count value TIL and the index value as control signals. In other examples, only one or the other of these values is used to make the selection, or the selection is made solely in software, for example by the generic processor 110 (not illustrated in FIG. 2).

In a first phase of operation of the device 102, the monotonic counter 106 generates a first count value TIL, equal to, for example, 0, and transmits this value to the key derivation circuit 118, as well as the selection circuit 120. The device master key is for example also transmitted to the key derivation circuit 118, which derives a first master encryption key MK0 204 based on the first count value TIL 0, and in some cases also based on the device master key 202. The key derivation circuit 118 then transmits the key MK0 to the cryptographic processor 116, allowing decryption of one or more encrypted encryption keys from the memory 104. In this example, these are the encrypted encryption keys associated with the count value TIL 0, i.e., a first encrypted key $\{KEY\#1.0\}_{MK0}$ and another encrypted key $\{KEY\#2.0\}_{MK0}$.

In this example, the first encrypted key $\{KEY\#2.0\}_{MK0}$ is decrypted. The KEY#2.0 key 206 resulting from this decryption remains in the cryptographic processor 116, for example, before being used in turn to decrypt the first encrypted code 216a. The first encrypted code 216a is then transmitted to the cryptographic processor 116 and decrypted using the key KEY#2.0. For example, the key KEY#1.0 resulting from the decryption of the other encrypted key $\{KEY\#1.0\}_{MK0}$ is used to decrypt another encrypted code not represented in FIG. 2. The first unencrypted code 216b, corresponding to the decryption of the first encrypted code 216a, is for example transmitted to the memory 112 and is for example executed by the processor 110.

In a second phase of operation of the device 102, the monotonic counter 106 generates a second count value TIL, equal to, for example, 1. For example, the first unencrypted code 216b, or another code executed during the first phase of operation, comprises an instruction to increment the monotonic counter 106. After this increment of the count value TIL, the key derivation circuit 118 is no longer able to derive the master encryption key MK0, because the value of TIL is greater than the first value TIL 0. Furthermore, in some examples, the selection circuit 120 is configured to prohibit, based on a count value TIL greater than 0, access to encrypted encryption keys associated with the count value TIL 0.

The second count value TIL is transmitted to the key derivation circuit 118, as well as to the selection circuit 120. The device master key is, for example, also transmitted to the key derivation circuit 118, which derives a second master encryption key MK1 208 based on the second count value TIL 1, and in some cases also based on the device master key 202. The key derivation circuit 118 then transmits the key MK1 to the cryptographic processor 116, enabling the decryption of one or more encrypted encryption keys from the memory 104. In this example, these are the encrypted encryption keys associated with the count value TIL 1, i.e., an encrypted key $\{KEY\#1.1\}_{MK1}$.

In this example, the encrypted key $\{KEY\#1.1\}_{MK1}$ is decrypted. The key KEY#1.1 206 resulting from this decryption remains for example in the cryptographic processor 116, before being used in turn to decrypt the second code 218a. The second encrypted code 218a is then transmitted to the cryptographic processor 116 and decrypted using the key KEY#1.1. The second unencrypted code 218b, corresponding to the decryption of the first encrypted code 218a, is, for example, transmitted to the memory 112 and is, for example, executed by the processor 110.

In a third phase of operation of the device 102, the monotonic counter 106 generates a third count value TIL, equal to, for example, 2. For example, the second unencrypted code 218b, or another code executed during the second phase of operation, comprises an instruction to increment the monotonic counter 106. After this increment of the count value TIL, the key derivation circuit 118 is no longer able to derive the master encryption keys MK0 and MK1, as the value of TIL is greater than the first and second values TIL 0 and TIL 1. Additionally, in some examples, the level value TIL 2 is transmitted to the selection circuit 120, which is configured to prohibit, based on a count value TIL greater than 1, access to the encrypted encryption keys associated with the count values TIL 0 and TIL 1.

The third count value TIL is transmitted to the key derivation circuit 118, as well as to the selection circuit 120. The device master key is, for example, also transmitted to the key derivation circuit 118, which derives a third master encryption key MK2 212 based on the second count value TIL 2, and in some cases also based on the device master key 202. The key derivation circuit 118 then transmits the key MK2 to the cryptographic processor 116, allowing decryption of one or more encrypted encryption keys of the memory 104. In this example, these are the encrypted encryption keys associated with the count value TIL 2, i.e., an encrypted key $\{KEY\#3.2\}_{MK2}$.

In this example, the encrypted key $\{KEY\#3.2\}_{MK2}$ is decrypted. The key KEY#3.2 214 resulting from this decryption remains, for example, in the cryptographic processor 116, before being used in turn to decrypt the third code 220*a*. The third encrypted code 220*a* is then transmitted to the cryptographic processor 116 and decrypted using the key KEY#3.2. The third unencrypted code 220*b*, corresponding to the decryption of the second encrypted code 220*a*, is, for example, transmitted to the memory 112 and is, for example, executed by the processor 110.

Figure 3:
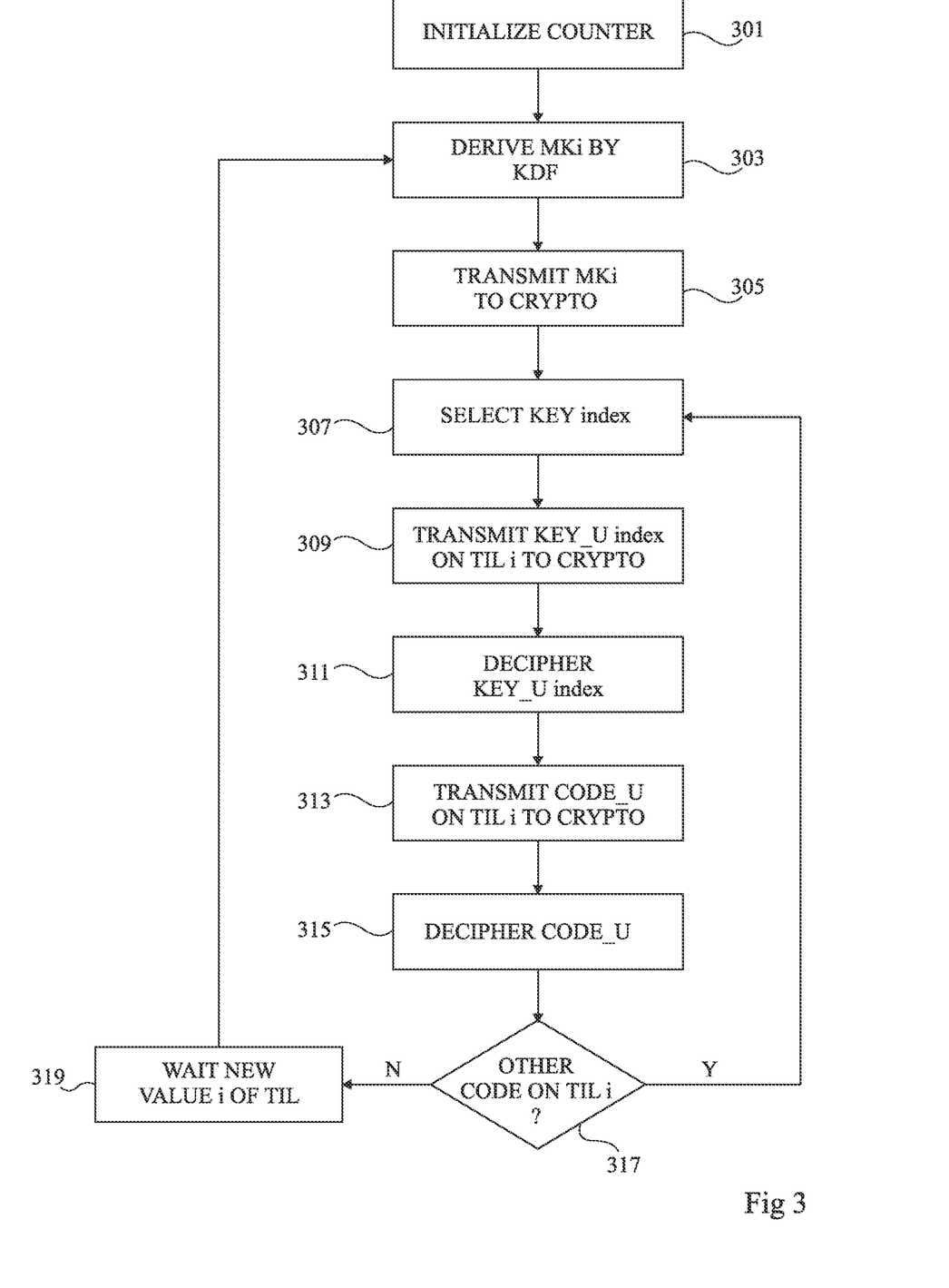
FIG. 3 is a flowchart representing the operations of a method for decrypting, by a cryptographic processor, an encrypted code according to an example of one embodiment of the present description.

FIG. 3 is a flowchart representing operations of a method for decrypting an encrypted code according to one embodiment of the present description. This method is, for example, implemented by the generic processor 110, the monotonic counter 106, the selection circuit 120, and the cryptographic processor 108 of the processing device of FIG. 1.

In a step 301 (INITIALIZE COUNTER), the monotonic counter 106 is initialized to an initial value, being a natural number. In the example in which the count value TIL is stored in a volatile manner, each power-up of the processing device causes the count value to be initialized, for example to 0. In another example in which the count value is stored on non-volatile storage element, each power-up of the processing device causes the current count value to be replaced with the initial count value, for example equal to 0. For example, the step 301 occurs following a booting of the processing device 102.

In some embodiments, the initial count value generated following a power-up may vary depending on the context of the processing device. For example, one or more count values correspond to isolation levels reserved for the manufacturer of the device 102, and a power-up by an intermediate entity between the manufacturer and the end user and/or by the end user will trigger a count value higher than these reserved count values. For example, if count value 0 is reserved for the manufacturer, a power-up by an intermediary entity between the manufacturer and the end user and/or by the end user will trigger a count value equal to 1 and the boot code(s) and sensitive data associated with isolation level 0 will be inaccessible. For example, once manufacturing is complete, one or more bits stored in a non-volatile memory 104, or other memory, are programmed to ensure that the count value is initialized to 1. In one example, these bits correspond to a signature-protected value indicating the initial count value to be applied. For example, the signature is generated based on an encryption key, and may for example correspond to a MAC (Message Authentication Code) signature. This value is for example supplied to the monotonic counter 106 by the bus 128. It is then possible, by changing the signature-protected value, to start the monotonic counter 106 back at 0, or at another value, during the life of the device.

In a step 303 (DERIVE MKi BY KDF) subsequent to step 301, the monotonic counter 106 transmits the current count value TIL i to the key derivation circuit 118. The key derivation circuit 118 generates a derived master key MKi based on the value of the level TIL i, and in some cases based on the device master key. Other parameters could also be considered for deriving the derived master key MKi.

In a step 305 (TRANSMIT MKi TO CRYPTO), subsequent to step 303, the derived master key MKi is transmitted to the cryptographic processor 116.

In a step 307 (SELECT KEY index), an index value identifying an encrypted encryption key from the memory 104 is, for example, transmitted to the selection interface 120, along with, in some cases, the count value TIL i.

By way of example, in step 307, the generic processor 110 instructs the decryption of an encrypted code whose encryption key is associated with the value of the level TIL i. The index value information identifying the corresponding encryption key is, for example, transmitted to the selection circuit 120 and the selection circuit 120 selects, based on the level value TIL i and the index value, the corresponding encrypted encryption key.

The step 307 is presented as an example, and other ways of selecting a key from the memory 104 are possible.

In a step 309 (TRANSMIT KEY_U index ON TIL i TO CRYPTO), subsequent to step 307, the encrypted encryption key selected in the step 307 is transmitted, for example by means of the bus 128, to the cryptographic processor 116. In another example, the selected encrypted encryption key is transmitted to the cryptographic processor 116 by means of a dedicated bus (not illustrated) exclusively connecting the memory 104, in particular the areas 122, 124 and 126, and the cryptographic processor 116.

In a step 311 (DECIPHER KEY_U index), subsequent to step 309, the cryptographic processor 116 decrypts, using the derived master key MKi generated in the step 303, the encrypted key transmitted in the step 309 to the cryptographic processor 116. An unencrypted encryption key is thus obtained and remains, for example, in a memory of the cryptographic processor 116. In other words, the unencrypted encryption key is not transmitted to any other processor or to any memory of the device 102.

In a step 313 (TRANSMIT CODE_U ON TIL i TO CRYPTO), the encrypted code CODE_U is transmitted, for example, under control of the generic processor 110, to the cryptographic processor 116 by means of the data bus 128.

In a step 315 (DECIPHER CODE_U), subsequent to step 315, the encrypted code and/or the data CODE_U is decrypted by the cryptographic processor 116 using the encryption key selected in step 307 and decrypted in step 311. Once the CODE_U code has been decrypted, it is, for example, transmitted to the RAM 112 memory by means of the bus 128 and then executed by the generic processor 110. For example, following execution of the decrypted code, the method continues to a step 317 (OTHER CODE ON TIL i?) in which the generic processor 110 determines whether other encrypted codes and/or data stored, for example, in the memory 114 and whose encryption key is associated with the count value TIL i are pending decryption. If this is the case (branch Y) the method resumes at step 307 in which a new index value of a new code is determined and the encrypted encryption key associated with the level value TIL and identified by the new index value is selected by the selection circuit 120.

If, following step 317, all encrypted codes associated with an encryption key associated with the count value TIL i have been correctly decrypted and transmitted to the RAM 112 memory, then (branch N) the method continues in a step 319 (WAIT NEW VALUE OF TIL i) in which the selection circuit 120 is waiting for a new count value TIL i. For example, the count value TIL i is incremented when moving from one operating phase to another operating phase of the processing circuit 102. When a new count value TIL i is generated by the monotonic counter 106, the method resumes at step 303 and the encrypted encryption keys associated with a TIL level value lower than the new TIL level value are no longer accessible.

Figure 4:
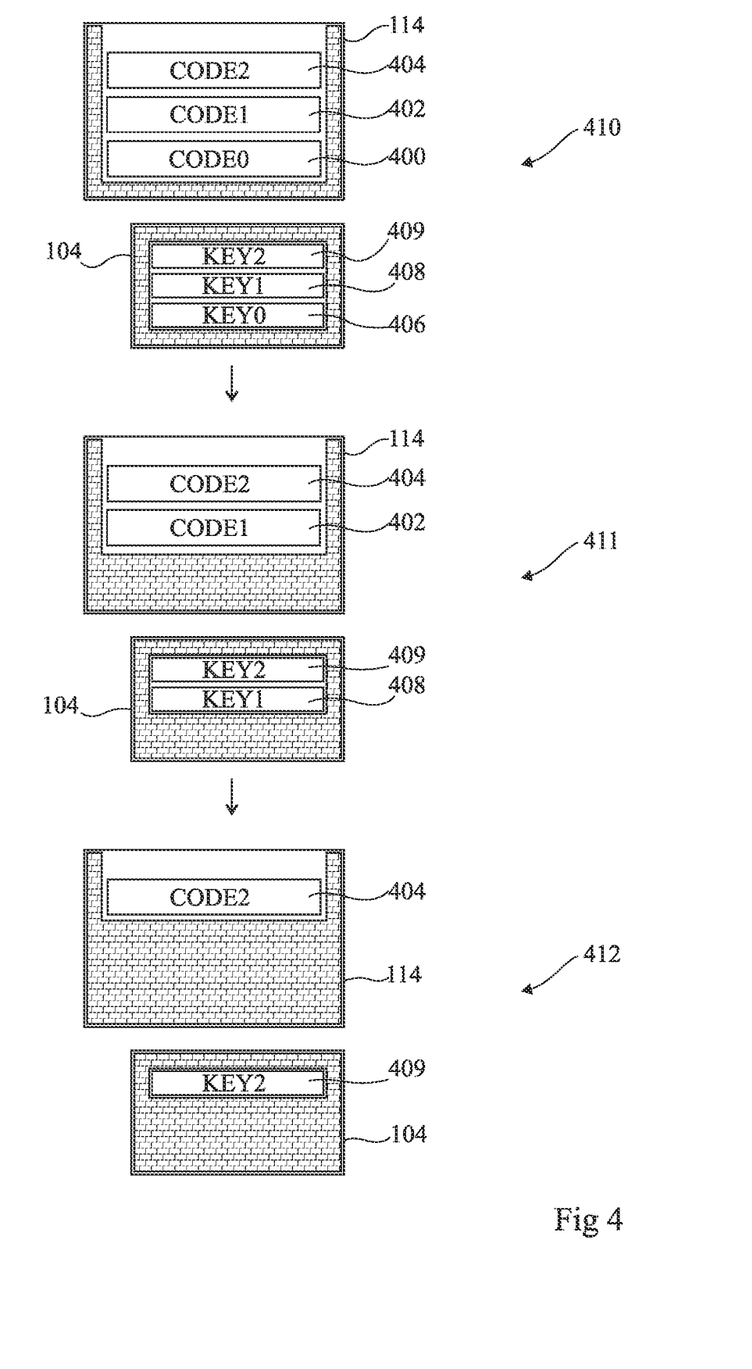
FIG. 4 represents data and codes accessible during a secure boot according to another embodiment of the present description.
Figure 5:
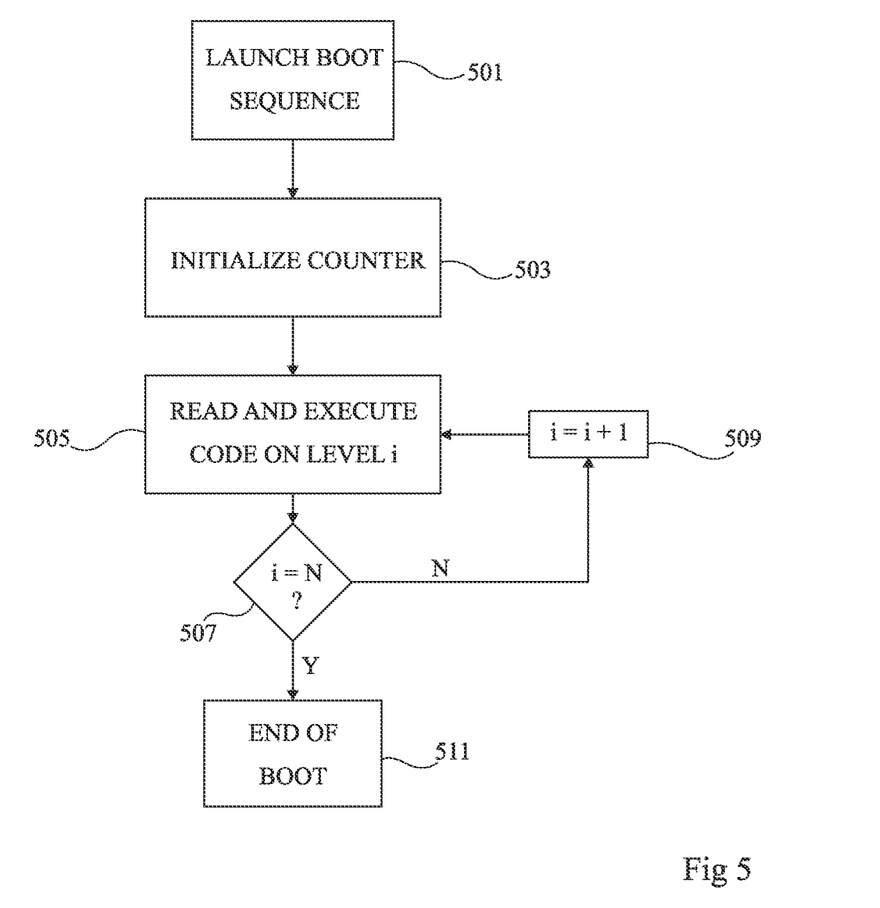
FIG. 5 is a flowchart representing operations of a secure boot method of a processing device according to an example of one embodiment of the present description.
Figure 6:
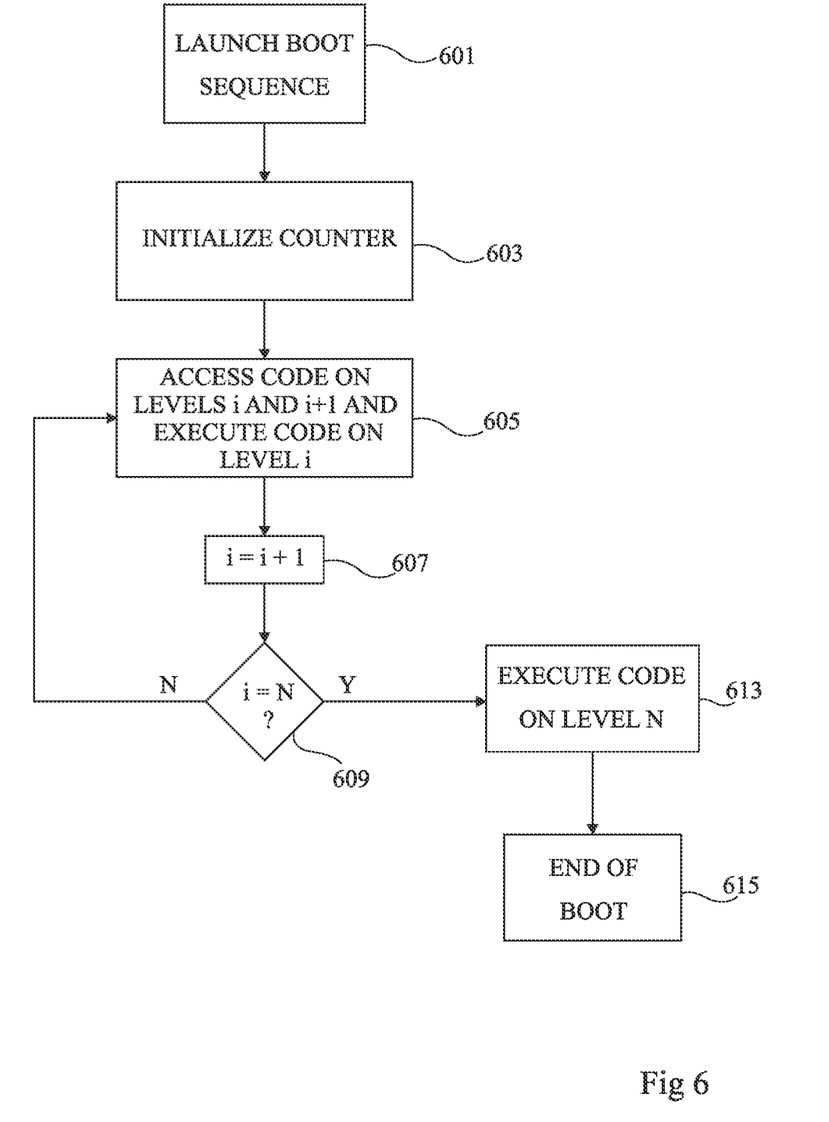
FIG. 6 is a flowchart representing operations of a secure boot method of a processing device according to another example embodiment of the present description.

FIGS. 4-6 illustrate one embodiment of the present description in which the encrypted data are boot codes and/or encryption keys associated with those codes, and the level value TIL is incremented at the end of each step in the boot sequence. Each level value TIL further corresponds to one or more boot codes associated with each boot step; these codes being rendered inaccessible when the current level value TIL is greater than their associated level value TIL.

In the example shown in FIG. 4, memory areas 406, 408, and 409 store sensitive data associated respectively with boot codes 400, 402, and 404 stored in the non-volatile memory 114. The areas 406, 408, and 409 are, for example, separate areas from the areas 400, 402, and 404, but remain associated with an isolation level corresponding to that of the boot codes to which the data is associated. This sensitive data includes, for example, one or more encryption keys stored in each area 406, 408, and 409, and each of these areas is contained in the non-volatile memory 104. According to another embodiment, each area 406, 408 and 409 is a sub-area of the corresponding area 400, 402 and 404.

During a first step 410 of starting the processing device illustrated at the top of FIG. 4, the current count value is, for example, equal to 0. In the example in FIG. 4, an isolation level 0 is associated with a first code (CODE0) as well as with first sensitive data (KEY0). A memory access control circuit 114 (not represented) and the selection circuit 120 are configured, for example, so that this first code and these first data are exclusively accessible when the current count value is equal to 0. However, during the step 410, the access control circuit and the selection circuit authorize, for example, access to all memory areas 400, 402 and 404, as well as to all areas 406, 408 and 409. Indeed, in certain cases, in order to anticipate subsequent steps in the boot method, for example, one or more other boot codes (CODE1, CODE2) are accessible for reading during the step 410.

For example, once the first code CODE0 is executed, the generic processor 110 controls a first increment of the current count value by the monotonic counter 106. For example, the first code comprises a command requesting the increment of the counter. This command is, for example, transmitted to a control register (not illustrated) of the monotonic counter.

After this first increment, the current count value of the monotonic counter 204 is, for example, equal to 1, corresponding to a second boot step 511. The access control circuit as well as the selection circuit 120 receive the new current count value, and are configured to prevent, on the basis of this count value greater than 0, any access to the first code as well as to the first data that are associated with the isolation level 0. In other words, the memory areas 400 and 406 are locked on the basis of any count value strictly greater than 0.

The isolation level 1 is associated with a second code (CODE1) contained in the area 402 as well as with the second data (KEY1) contained in the area 408. According to one embodiment, a third code (CODE2), for example associated with the isolation level 2 and contained in the area 404, is accessible for reading based on the current count value equal to 1.

For example, once the second code CODE1 is executed, the generic processor 110 controls a second increment of the current count value by the monotonic counter 106. For example, after this second increment, the current count value of the monotonic counter 106 is equal to 2, corresponding to a third boot step 412. The isolation level 2 is associated with the third code CODE2 as well as the third data (KEY2). The access control circuit and the selection circuit 120 receive the new count value, and are configured to prevent, based on this count value greater than 1, any access to the first and second codes as well as the first and second data that are associated with isolation levels less than or equal to 1.

According to one embodiment, when the last boot code is executed, for example the third boot code, the generic processor 110 controls a third increment of the current count value by the monotonic counter. The access control circuit and the selection circuit 120 then lock out any access to the first, second, and third boot codes as well as the first, second, and third data.

According to another embodiment, when the last boot code is executed, for example the third boot code, the current count value is not incremented by the monotonic counter 106 and access to the third boot code as well as the third data remains allowed by the access control circuit.

FIG. 5 is a flowchart representing operations of a secure boot method of a processing device according to an example embodiment of the present description. This method is implemented by, for example, the generic processor 110, the monotonic counter 106, the access control circuit and the selection circuit 120 of the processing device of FIG. 1.

In a step 501 (LAUNCH BOOT SEQUENCE) the processing device 102 starts. In one example this is the first booting of the device 102 after it's manufacture. In another example, it is a boot performed by an intermediate entity between the manufacturer of the device 102 and its end user. In yet another example, it is a so-called operational boot of the electronic device 100 performed by the end user.

In a step 503 (INITIALIZE COUNTER), subsequent to step 501, the monotonic counter is initialized to an initial value, being a natural number. In the example in which the count value is stored in a volatile manner, each booting of the processing device causes the count value to be initialized, for example to 0 or to 1. In another example in which the count value is stored in a non-volatile manner, each booting of the processing device causes the current count value to be replaced with the initial count value, for example equal to 0 or to 1.

In certain embodiments, the initial count value generated following a booting may vary according to the state, or context, of the processing device 102. For example, one or more count values correspond to one or more isolation levels reserved for an initial setting phase of the device 102, comprising, for example, the installation of firmware. The data and/or codes associated with these isolation levels are, for example, used for this initial setting.

For example, following manufacture, the processing device 102 has the context "blank" and the initial count value is equal to a value reserved for settings, such as 0. Once the setting is complete, the context of the device becomes, for example, "settings complete." With this new context, powering up the device 102, for example by an intermediate entity between the manufacturer and the end user and/or by the end user, will then trigger a count value greater than the reserved count value, and for example equal to 1. The boot code(s), as well as the sensitive data, associated with the isolation level corresponding to the reserved count value will, therefore, be inaccessible.

For example, the context of the device is detected by the presence of a voltage on a start-up pin of the device, this voltage being applied, for example, by adding a jumper between the start-up pin and another pin at a supply voltage. Additionally or alternatively, the context of the device is detected by the value of one or more bits stored in a non-volatile, protected manner in the memory 104, or in another memory.

In one example, the generic processor 110 is arranged to detect the context of the device 102 upon powering up the device 102, and to configure the initial count value of the monotonic counter 106 accordingly. In another example, the monotonic counter 106 is arranged to detect the context of the device 102 itself and to configure its initial count value itself, upon powering up the device 102.

In a step 505 (READ AND EXECUTE CODE ON LEVEL i), subsequent to step 503, the data and boot codes associated with the isolation level i are read by the generic processor 110 and the boot codes associated with the isolation level i are executed. Once the codes of level i are executed, the generic processor 110 compares, in a step 507 (i=N?) the count value i to the value N, where N is the count value associated with the last step in the boot sequence, in other words, the boot codes of isolation level N are the last to be executed according to the embodiment of the present description. For example, in the example of FIG. 4, N is equal to 2. If i is not equal to N (N branch), the method continues in a step 509 (i=i+1) in which the generic processor triggers the increment of the count value. For example, the count value increases from i to i+1. It is also possible that the increment increases the value i by several units. The method then resumes at step 505.

In the event that, as a result of the comparison step 507, the count value is equal to N (Y branch), the method ends at a step 511 (END OF BOOT) in which the boot of the processing device ends. According to one embodiment, the current count value remains equal to N following the step 511. According to another embodiment, the count value is incremented in the step 511, and the current count value becomes equal to N+1. In this second case, the access control circuit and the selection circuit are configured to prevent access to all boot codes based on this count value.

FIG. 6 is a flowchart representing operations of a secure boot method of a processing device according to another example embodiment of the present description. This method is implemented, for example, by the generic processor 110, the monotonic counter 106, and the access control circuit and selection circuit 120 of the processing device of FIG. 1.

Steps 601 and 603 are similar to steps 501 and 503 of FIG. 5 and will not be described again in detail.

In a step 605 (ACCESS CODE ON LEVELS i AND i+1 EXECUTE CODE ON LEVEL
i), subsequent to step 603, the data and boot codes associated with the isolation levels i+1 are accessed by the generic processor 110 and the boot code(s) associated with isolation level i are executed.

In one example, the data or codes associated with isolation level i contain one or more encryption keys, encrypted or unencrypted, which will be used when executing one or more codes associated with isolation level i+1. Thus, a write access is for example authorized on the memory area(s) associated with the isolation level i+1 in order to provision the keys to the codes associated with the isolation level i+1.

In another example, the codes associated with isolation level i contain instructions to verify the integrity of the data and/or codes associated with isolation level i+1. Thus, read access to the memory area(s) associated with isolation level i+1 is permitted in order to perform this verification.

In a step 607 (i=i+1), subsequent to step 605, the count value is incremented. For example, the count value increases from i to i+1. In other examples, the increment increases i by several units.

In a step 609 (i=N?) the generic processor 110 compares the count value i to the value N, where N is defined as described relative to step 507 in FIG. 5. If the value i is not equal to N (branch N) the method returns to step 605.

In the event that in the comparison step 609 the count value is equal to N (branch Y), the method continues to a step 613 (EXECUTE CODE ON LEVEL N) in which the boot code(s) associated with the isolation level N are executed.

Booting the processing device ends with a step 615 (END OF BOOT), which is similar to step 511 in FIG. 5, and is not described again in detail.

The method whose implementation is shown in FIG. 6 allows for a staggered reading of the boot codes. Indeed, the boot codes associated with an isolation level are read when the count value is lower than the level value. This saves time relative to the implementation of the method shown in FIG. 5.

An advantage of the described embodiments is that codes, as well as confidential, sensitive data, are effectively protected by the use of a monotonic counter and a key derivation circuit to lock the decryption of encrypted keys.

Various embodiments and variants have been described. Those skilled in the art will understand that certain features of these embodiments can be combined and other variants will readily occur to those skilled in the art. In particular, different types of processors may be used. In addition, the number of isolation levels may vary.

Finally, the practical implementation of the embodiments and variants described herein is within the capabilities of those skilled in the art based on the functional description provided hereinabove. In particular, the implementation of the selection of the encryption keys is within the reach of the person skilled in the art.

What is claimed is:

1. A method for decrypting encrypted data, the method comprising:
generating a first count value by a monotonic counter of a processing device;
deriving, using a key derivation circuit, a first encryption key based on the first count value;
transmitting the first encryption key to a cryptographic processor;
decrypting, based on the first encryption key, first encrypted data stored in a non-volatile memory; and
preventing access to the first encrypted data based on a current count value from the monotonic counter being greater than the first count value.

2. The method according to claim 1, wherein the first encrypted data comprises a first set of one or more further encrypted encryption keys associated with the first count value.

3. The method according to claim 2, further comprising:
selecting the first set of one or more further encrypted encryption keys from the non-volatile memory; and
providing the first set of one or more further encrypted encryption keys to the cryptographic processor, the decrypting the first encrypted data comprising decrypting the first set of one or more further encrypted encryption keys by the cryptographic processor based on the first encryption key.

4. The method according to claim 3, further comprising: decrypting, by the cryptographic processor or another cryptographic processor, first other encrypted data stored in the non-volatile memory or in another memory, based on the decrypted first set of one or more further encrypted encryption keys.

5. The method according to claim 4, wherein decrypting the first other encrypted data is performed by the cryptographic processor, the decrypted first set of one or more further encrypted encryption keys being stored in the non-volatile memory of the cryptographic processor.

6. The method according to claim 1, further comprising:
generating a second count value by the monotonic counter of the processing device;
deriving, using the key derivation circuit, a second encryption key based on the second count value; and
transmitting the second encryption key to the cryptographic processor; and
decrypting, based on the second encryption key, a second encrypted data.

7. The method according to claim 6, wherein the monotonic counter is initialized to the first count value upon a first boot of the processing device, the method further comprising, initializing the monotonic counter to the second count value upon a second boot of the processing device.

8. The method according to claim 7, further comprising performing another boot of the processing device during which the monotonic counter is initialized to the first count value if a device state condition is satisfied.

9. The method according to claim 8, wherein the device state condition corresponds to a programming state of an area of the non-volatile memory storing the first encrypted data.

10. The method according to claim 1, wherein transmission of the first encryption key to the cryptographic processor is performed via a dedicated bus.

11. The method according to claim 1, wherein the non-volatile memory comprises a plurality of separate non-volatile memories.

12. A data processing device comprising:
a monotonic counter configured to generate a first count value;
a key derivation circuit configured to derive, using a key derivation function, a first encryption key based on the first count value;
a cryptographic processor configured to:
  receive the first encryption key; and
  decrypt, based on the first encryption key, first encrypted data; and
a non-volatile memory configured to:
  store the first encrypted data; and
  prevent access to the first encrypted data based on a current count value from the monotonic counter being greater than the first count value.

13. The method according to claim 12, wherein the non-volatile memory comprises a plurality of separate non-volatile memories.

14. A method for decrypting encrypted data, the method comprising:
receiving a first count value from a monotonic counter of a processing device;
deriving, using a key derivation circuit, a first master encryption key based on the first count value and a master encryption key;
transmitting the first master encryption key to a cryptographic processor;
decrypting, based on the first master encryption key, a first encrypted key stored in a non-volatile memory; and
preventing access to the first encrypted key based on a current count value from the monotonic counter being greater than the first count value.

15. The method according to claim 14, further comprising decrypting, based on the first master encryption key, another first encrypted key, the first encrypted key and the another first encrypted key comprising a first set of encrypted encryption keys associated with the first count value.

16. The method of claim 14, further comprising:
transmitting the first encryption key to the cryptographic processor or another cryptographic processor; and
decrypting, based on the first encryption key, a first encrypted code.

17. The method of claim 16, further comprising:
launching a boot sequence;
initializing the monotonic counter that provides the first count value; and
reading and executing a first decrypted code obtained from decrypting the first encrypted code.

18. The method according to claim 14, further comprising:
receiving a second count value from the monotonic counter of the processing device;
deriving, using the key derivation circuit, a second master encryption key based on the second count value;
transmitting the second master encryption key to the cryptographic processor;
decrypting, based on the second master encryption key, a second encrypted key;
transmitting the second encryption key to the cryptographic processor or another cryptographic processor; and
decrypting, based on the second encryption key, a second encrypted code.

19. The method according to claim 18, wherein the monotonic counter is initialized to the first count value upon a first boot of the processing device, the method further comprising, initializing the monotonic counter to the second count value upon a second boot of the processing device.

20. The method according to claim 19, further comprising performing another boot of the processing device during which the monotonic counter is initialized to the first count value if a device state condition is satisfied, the device state condition corresponding to a programming state of an area of the non-volatile memory.

* * * * *